United States Patent
Kunjithapatham et al.

(10) Patent No.: US 8,145,648 B2
(45) Date of Patent: Mar. 27, 2012

(54) SEMANTIC METADATA CREATION FOR VIDEOS

(75) Inventors: Anugeetha Kunjithapatham, Sunnyvale, CA (US); Simon J. Gibbs, San Jose, CA (US); Priyang Rathod, Mountain View, CA (US); Phuong Nguyen, San Jose, CA (US); Mithun Sheshagiri, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 524 days.

(21) Appl. No.: 12/340,277

(22) Filed: Dec. 19, 2008

(65) Prior Publication Data

US 2010/0057694 A1    Mar. 4, 2010

Related U.S. Application Data

(60) Provisional application No. 61/093,977, filed on Sep. 3, 2008.

(51) Int. Cl.
*G06F 7/00* (2006.01)
*G06F 17/30* (2006.01)
*G06F 15/16* (2006.01)

(52) U.S. Cl. .................. 707/749; 707/738; 707/914

(58) Field of Classification Search .............. 707/738, 707/914, 749
See application file for complete search history.

(56) References Cited

U.S. PATENT DOCUMENTS

| | | | |
|---|---|---|---|
| 6,212,494 B1 * | 4/2001 | Boguraev | 704/9 |
| 6,311,194 B1 * | 10/2001 | Sheth et al. | 715/236 |
| 6,363,380 B1 * | 3/2002 | Dimitrova | 707/740 |
| 6,505,194 B1 * | 1/2003 | Nikolovska et al. | 707/914 |
| 7,765,212 B2 * | 7/2010 | Surendran et al. | 707/738 |
| 2002/0091684 A1 * | 7/2002 | Nomiyama et al. | 707/3 |
| 2005/0060304 A1 * | 3/2005 | Parikh | 707/3 |
| 2007/0198508 A1 * | 8/2007 | Yoshimura | 707/5 |
| 2008/0204595 A1 * | 8/2008 | Rathod et al. | 707/3 |

OTHER PUBLICATIONS

Google Base. "Post it on Base. Find it on Google". http://base.google.com/base/?gsessionid=--R9Htt7s9M. Downloaded on Mar. 17, 2009. 1pg.

* cited by examiner

*Primary Examiner* — Greta Robinson
*Assistant Examiner* — Brian E. Weinrich
(74) *Attorney, Agent, or Firm* — Beyer Law Group LLP (57) ABSTRACT

A computing system creates and stores semantic metadata on content, such as videos, that enables efficient searching of the content. The existing metadata of a video file, for example, is examined and a keyword list is created. The processes used to derive the keyword list may depend on the type and format of the existing metadata. The keywords from the list are compared against external structured knowledge data sources that are topic oriented. Based on these comparisons and the matches found, semantic data, including topic, topic type, and attribute data are inserted into a topic table. This uniform and structured table is stored on the computing system and is efficiently searchable for finding relevant videos and for finding relationships between videos.

15 Claims, 5 Drawing Sheets

| 404 | 406 | 408 | 410 | 412 | 414 |
|---|---|---|---|---|---|
| Video ID | Topic/sub-topic | Topic Type | Topic-ID | Rank | Parent Topic |
| | | | | | |

SEMANTIC METADATA CREATION FOR VIDEOS

CROSS-REFERENCE TO RELATED APPLICATIONS

This application claims priority to Provisional Patent Application No. 61/093,977, filed on Sep. 3, 2008, entitled "SYSTEM AND METHODOLOGY TO SEMANTICALLY TAG VIDEO CONTENT AND TO IDENTIFY INTERESTING RELATIONS BETWEEN VIDEOS" by Kunjithapatham et al., and is hereby incorporated by reference in its entirety and for all intents and purposes.

BACKGROUND OF THE INVENTION

1. Field of the Invention

The present invention relates generally to processing and configuring data in computing systems. More specifically, it relates to creating and storing semantic metadata for videos in computing systems.

2. Description of the Related Art

Over the last several years, the volume of videos has increased nearly exponentially, a large contributor being various Web 2.0 online sites, such as YouTube, Flickr, and many others. These sites allow users to upload their own videos and share them with the public. Of course, before such sites became popular and people created their own personal or home-type videos, there were a large number of videos from professional and private sources. These included movies, TV shows, news programs, documentaries, instructional videos, institutional videos, and the list continues. As a result, there is now a huge and formidable body of videos available to the public today.

However, this growth has been viral and occurred without much structure or organization. Some of the more professional sources, like TV and cable networks, movie studios, and news organizations may have some type of scheme or structure when organizing their video content, but the vast majority of personal or, more generally, non-professionally-sourced videos, are not placed in a detailed index or an existing structure in a meaningful way; essentially they are created, tagged with a brief, informal description (typically, a few words) and posted online. Many individuals creating short videos often do not want to spend much time thinking about metadata, attributes, topic types, and so on. A quickly derived title and maybe one or two "keywords" or tags often seem sufficient as far as the maker of the video is concerned. Tags, titles, and descriptions are sometimes associated with the videos, but there's no standard way of providing these. As a result, searching videos has become somewhat haphazard and random.

A searcher is never certain whether she has found all or most of the truly relevant videos. Furthermore, interesting relationships, similarities, and other indirect connections between videos are missed. Thus, a searcher may find a few relevant videos in her search, but may miss a significant number of videos directly "on point" and will likely not see many videos that have some interesting relationship to the subject being searched or to the identified videos. The reasons for this are varied, but they essentially stem from the lack of a common way to tag or provide metadata for videos when they are created and stored. To cite one example, a video creator may provide a topic name such as "South Africa" but may not specify that the topic type is "location" or "country," or other attributes, such as history, cuisine, travel, and the like. Or if such an attribute is provided, it may be inherent in the title, such as "Budget Travel in South Africa," or "South Africa, Economic Statistics" and so on.

SUMMARY OF THE INVENTION

One embodiment is a method of creating semantic metadata for a file. Existing metadata associated with a file, such as a video file or a digital photograph file, is examined and multiple keywords are created using the existing metadata. Semantic metadata may be derived utilizing the multiple keywords which, in one embodiment, may be in the form of a keyword list. The semantic metadata is stored in a searchable file, such as a relational database table, where the metadata may be arranged based on topic and topic-type, thereby facilitating queries and searches of multiple files. As noted, in embodiment, the file is a video and the semantic data in the file describes multiple videos. In this manner, efficient searches of video archives or libraries may be made using semantic metadata relating to the videos.

In one embodiment, keywords may be extracted from narrative type existing metadata, such as titles and descriptions. Natural language processing may be used to extract these keywords. Keywords may also be derived from tag-type existing metadata associated with the file (i.e., lists of "tag" words associated with the file). The sub-routines for deriving keywords from this type of metadata may depend on how the tag list is formatted, such as with or without commas or delimiters. In another embodiment, the semantic metadata is derived using one or more external structured knowledge databases or sources that have topic-oriented data, such as topic name, topic type, and other attribute data associated with the topic. In this embodiment, keywords are compared with topics in the external databases to obtain further semantic metadata, such as topic type and attributes.

In another embodiment, a computing device for storing video files enables efficient searching of videos and allows users to find interesting or previously unrevealed relationships between videos. In one embodiment, the computing device includes a processor, a network interface, a semantic metadata module, and a memory. The network interface enables communication over a public network to external structured knowledge databases that may provide topic and attribute data. The memory stores a table or file that is searchable and contains semantic metadata for videos and has a topic field and a topic type field. The memory also contains keyword lists that are derived from existing metadata for a video file. The semantic metadata module may create the keyword list and stores the semantic metadata relating to a video in the table.

In one embodiment, the computing device may also have a natural language processor for deriving keywords from narrative-type existing metadata. In another embodiment, the computing device may include a metadata tagging sub-module for deriving keywords from tag-type existing metadata. In yet another embodiment, the table may have a rank field for storing relevance data relating to the relevance of a keyword source. In one embodiment, the computing device is a video server that stores a collection or archive of videos.

Another embodiment is a method of creating a keyword list for a video. Existing metadata associated with a video is received and examined. A first set of keywords is extracted from the existing metadata having a natural language format or a narrative format, such as titles and descriptions. A second set of keywords is derived from the metadata having a tag list format, that is, is a list of tag words or phrases, that may be descriptive of the video. A relevance rank is assigned to a keyword, where the relevance is based on the specific source within the existing metadata from where the keyword was derived or extracted. A keyword list may be created by combining the first and second sets of keywords, such that the keyword list is derived from the existing metadata associated with the video.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for creating semantic tags and semantically-enriched metadata for videos and storing and organizing this data so it may be searched efficiently and be queried in order to identify potential interesting relationships and similarities are described in the various figures. Processes for creating the semantic tags and enriched metadata are performed without or with minimal user intervention or input and are executed in a semi-automatic manner. The processes and systems described herein may be applied to newly created videos or to videos in an existing collection or archive of videos. In one embodiment, the semantic metadata tags for each video are stored in a table or file, which may be indexed by unique video identifiers and which may be searched to find relevant videos. The semantically-enriched metadata is embodied in the table. In another embodiment, the processes and systems described may also be applied to creating semantic metadata for digital photographs.

The various types of products and services that may implement the described embodiments of the present invention vary widely. For example, software may execute on a server-side system, such as on a "video" server, which creates semantic metadata for existing videos in video archives and creates it for new ones as they are added, without requiring customized or specialized reasoning/searching engines. The semantic data, arranged in a table or other file type may be stored on the server-side system (e.g., on the video server). In another example, the software may be sold as a home application for use by individuals to create semantic metadata for their personal (user-created) videos. The software may also be used to create a new feature in a television set that allows users to efficiently browse and access videos on the Internet, videos of broadcast programs, and/or on their digital video recorders, CD-ROMs, hard drives, and the like. In another example, the software may be used to enrich Electronic Program Guides (EPGs) presently available for TV and cable broadcast programs with more useful metadata, thereby adding value to state-of-the-art set-top boxes and TVs.

As will be evident from the description below, methods and systems disclosed may be used in other applications, systems, products, and services relating to videos. As described below, by creating semantically rich and meaningful metadata for videos, searches and other queries relating to videos are more efficient and productive. In one respect, utility and enjoyment of a video may be vastly increased by the fact that the video will be seen by more viewers who have a genuine interest or desire in seeing the video, certainly one of the primary objectives of any entity or person associated with creating the video. As will be evident from the description below, the term "semantic" and "semantically rich" have broad applications and descriptions with respect to metadata, as explained in the various diagrams. In one example, semantically rich metadata has more than simple keywords describing topics, but also include topic types and sub-attributes. As noted above, metadata for many "broadcast" videos, that is, videos of TV and cable network programs, may be in the form of an EPG, and such videos often provide closed captioning (for hearing impaired viewers or when audio is muted). Closed captions are a good source for identifying topics discussed in a program, but this topic information is often not organized or marked in a standard or specific way.

Figure 1:
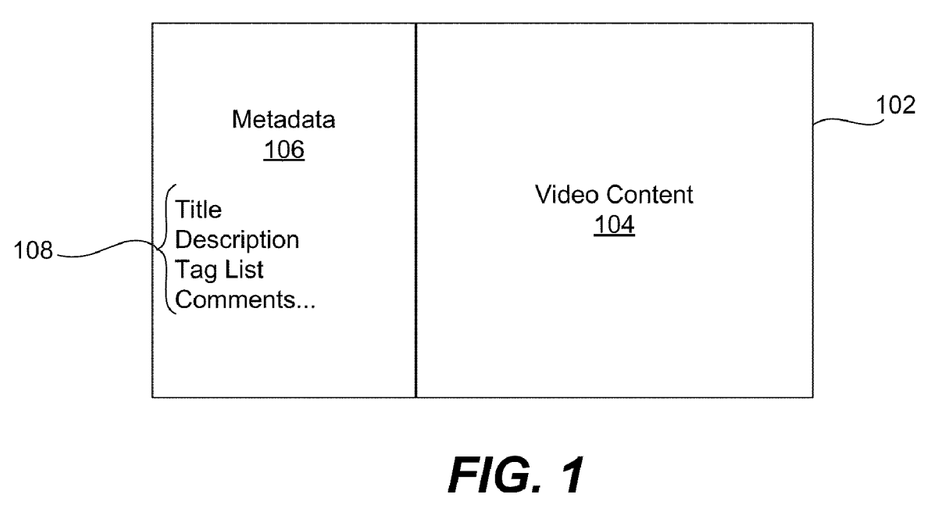
FIG. 1 is a block diagram showing an example format of a video file.

FIG. 1 is a block diagram showing an example format of a video file. A digital video is embodied in a file 102 which has a video content portion 104 and a metadata portion 106. In other embodiments, such as with broadcast programs or movies, metadata portion 106 may be in a separate file. The metadata 108 may consist of various types of data, depending on the source of the video. It should be noted that some videos may not have any metadata (not even a title or description). However, for a typical user-created video, metadata may consist of a title, description (e.g., a few sentences of what the video is about), a "tag" list, and possibly some comments. Many user-created videos (e.g., videos that are posted on YouTube, Flickr, Yahoo, or other popular sites) may only have a title. However, broadcast videos may contain additional metadata, such closed captions and other attributes which TV broadcasters may want to have associated with the video. The video content itself in video content portion 104 may be in various formats; however, this format information is not directly relevant to the present invention. As advancements are made in video technology, the format itself and the extent of metadata 108 in metadata portion 106 may change. However, these changes, such as increases in the typical amount of metadata, are still not likely to be standardized or be consistent across platforms, sites, organizations, broadcasters, etc. as advancements are made. In other words, the present problems with searching videos will likely persist or get more complex. Therefore, the present invention may still be useful for creating semantically enriched tags and storing them in a convenient arrangement to make searches more efficient and productive.

Figure 2:
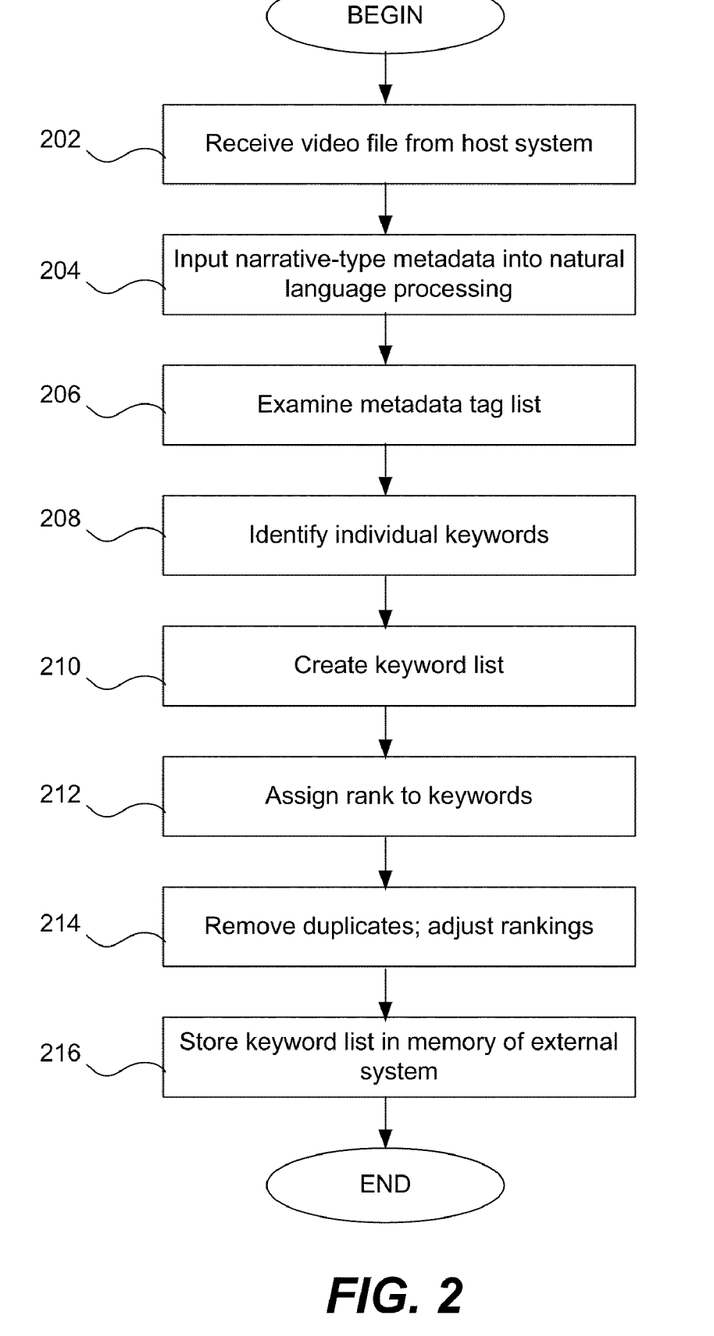
FIG. 2 is a flow diagram of a process of creating a keyword list for a given video in accordance with one embodiment.

FIG. 2 is a flow diagram of a process of creating a keyword list for a given video in accordance with one embodiment. The keyword list is then used to create semantic metadata or semantic tags (topics, type, sub-topics, rank, etc.) for the video, which are stored in an arrangement (e.g., a table) that facilitates searching and other functions. Semantic metadata or tag creation and storage processes are described in FIG. 3 below. Steps of the methods shown and described need not be performed (and in some implementations are not performed) in the order indicated, may be performed concurrently, or may include more or fewer steps than those described. For purposes of illustration, the processes of FIG. 2 are described from the perspective or point of view of the software, firmware, or other logic component(s) (hereinafter "semantic tagging module" or "tagging module") performing or executing the semantic metadata creation or "tagging." As noted, these computer instructions may execute on a server system (e.g., a video server), a PC, a mobile computing device, a digital video recording (DVR) device, a video/TV viewing system, among other portable, nomadic, handset, or stationary devices. The tagging module may accept as input a video file that contains metadata. Whether the video is new or from an existing library/archive generally does not have an effect on the inventive processes described. As noted above, videos may come from various sources, many from TV broadcasters and the general public ("users"); however, the processes described apply to videos from all sources. The primary difference (with respect to the present invention) is the format, amount, and specific items of metadata associated with each video.

At step 202 a semantic tagging module receives a video from an external system (referred to as "video server" for illustration) and extracts any metadata from the video file. If there is no metadata of any kind (including closed captions), the process may not continue and a message may be communicated to the operator that a minimal amount of metadata is required (e.g., "Unable to create tags; please provide a title for the video to continue."). The existing metadata for the video may include, as an example, a title, description, comments, and a tag list. For purposes of illustrating various embodiments of the invention, it is assumed that these metadata items are associated with the video. More generally, it is assumed that the tagging module knows what type of metadata (i.e., the basic fields) is available for the video. If a video has more or fewer metadata items, the processes described may still be applicable (in some cases, some of the steps described may not be needed).

Once the available (or existing) metadata for the video is retrieved, specific processing occurs depending on the type of metadata. At step 204 the title, description, and comments metadata are input to one or more natural language processing and keyword extraction modules. Methods and systems for natural language processing and extraction are described in U.S. application Ser. No. 11/789,609, titled "Method and System for Providing Access to Information of Potential Interest to a User," filed on Apr. 25, 2007, incorporated by reference herein in its entirety and for all purposes. Significant keywords and keyword phrases (hereinafter "keywords") those that are meaningful and useful in identifying what the video is about are extracted. Natural language processing is applied to these types of metadata because it is generally assumed that such metadata is in a narrative or quasi-narrative form. That is, they are in the form of sentences, sentence fragments, or phrases (e.g., titles) and, therefore, natural language processing may be appropriate and efficient in extracting the significant keywords. In one embodiment, a rank is assigned to each significant keyword, as described below.

At step 206 the metadata item referred to as a "tag list" is examined in order to determine a methodology for extracting the significant keywords. This list of tags may generally be in one of two formats: a list of words/phrases with commas (as delimiters) or the same type of list without commas (i.e., a string of words/phrases separated only by spaces). In one embodiment, each format may be processed differently for keyword extraction. If the tag list has commas or other delimiters, such as a semicolon, each tag separated by a delimiter is identified as a keyword. If there are no commas/delimiters (i.e., a space is used as a delimiter), keywords are identified using single and multiple tag combinations as described below.

At step 208 the individual tags from the tag list(s) are identified. An example of a tag list having commas may be: Bill Clinton, philanthropic foundation, speeches, economic aid, South Africa. In one embodiment, each tag is a keyword. At step 210, a new list of tags is formed. The new list is formed using each individual word from the list. Thus, each of the nine words from the list: "Bill Clinton philanthropic foundation speeches economic aid South Africa" is placed in the new list. In addition, in one embodiment, 2-word and 3-word tags are formed based on words appearing consecutively in the original list. Thus, the following tags are deemed keywords and placed on the list: 'Bill Clinton' 'Clinton philanthropic' 'philanthropic foundation' 'foundation speeches' and so on for the 2-word tags and 'Bill Clinton philanthropic' 'Clinton philanthropic foundation' 'philanthropic foundation speeches' and so on for the 3-word tags. These 2-word and 3-word tags are considered keywords at step 210.

At step 212 each keyword is placed in a list and assigned a rank indicating relevancy or potential importance. In one embodiment, ranks may be assigned to the keywords at the time they are extracted or derived. Keywords extracted from titles and description metadata items at step 206 may be assigned a high rank based on the general notion that users tend to think of titles and descriptions that are usually fairly descriptive of the video, making them more reliable sources for identifying topics. In one embodiment, the rank is based on a scale from 1 to 5, 5 being the most relevant (or coming from the most reliable source) and 1 being the least relevant (coming from the least reliable source). Of course, other implementations of scales or assigning importance may be used. Keywords from titles and descriptions may be assigned a rank of 5. Keywords from the comments, also extracted at step 204, may be assigned a low rank, such as 1, based on the assumption that the comments may not be a reliable source as to the topics discussed in the video.

Keywords from the tag list having commas derived at step 208 may be assigned a rank of 2.5, indicating that such a list, separating specific tags with commas, is of medium relevance. Keywords from the list not having commas are assigned a rank of 2 or 1.75 indicating that because of the lack of commas (delimiters) and the assumptions that were made in creating the 1-word, 2-word, and 3-word length keywords, the reliability of such keywords is assumed to be relatively low. In other embodiments, other methodologies of analyzing a tag list without commas (or delimiters) may be used. In a simple variation, 3-word tags may not be considered or the method may go further and consider 4-word tags. In another example, 1-word tags may be given a higher or lower ranking than 2-word tags and so on. In another example, keywords that are proper nouns may be given a higher rank. The rankings of the keywords derived using this "sub-process" need not all be the same. Thus, at step 212, a list of keywords, each or most keywords having a rank, has been formed.

In other embodiments, various other ranking methodologies may be used. The one described here is only an example. The entity providing the service or product may make its own determinations on the relevance and reliability of the metadata sources and make rankings of keywords derived from these sources according to its own findings. As noted, there may be other sources of metadata not described in the example, such as closed captions for broadcast TV videos (which are generally not available for user-generated videos or for photos), from which keywords may be extracted and rankings may be assigned as determined by the product or service provider.

At step 214 the list is processed to remove duplicate keywords. In one embodiment, if a keyword occurs more than once, the rankings are added and the keyword is given a single entry in the list with a summed ranking. Thus, using the earlier example, some keywords may have a ranking higher than 5. Because of their multiple occurrences in the various metadata sources, it is assumed that they have a higher relevance and are more indicative of topics discussed in the video. In one embodiment, the list may be organized with the keywords having the highest ranking at the top of the list and keywords with the lowest ranking at the bottom, although such an ordering is not necessary.

At step 216 the keyword list for the video is stored as a relational database table or in a file in non-volatile memory on the system or device executing the semantic tagging module. A specific keyword list may be identified using a unique video identifier corresponding to the video. It may also be stored as a flat file or in another appropriate format. At this stage, a final keyword list containing keywords (as noted, this includes phrases or strings of more than one word) and their rankings has been created, thereby completing the first phase of one process of automatically creating semantic metadata tags.

Figure 3:
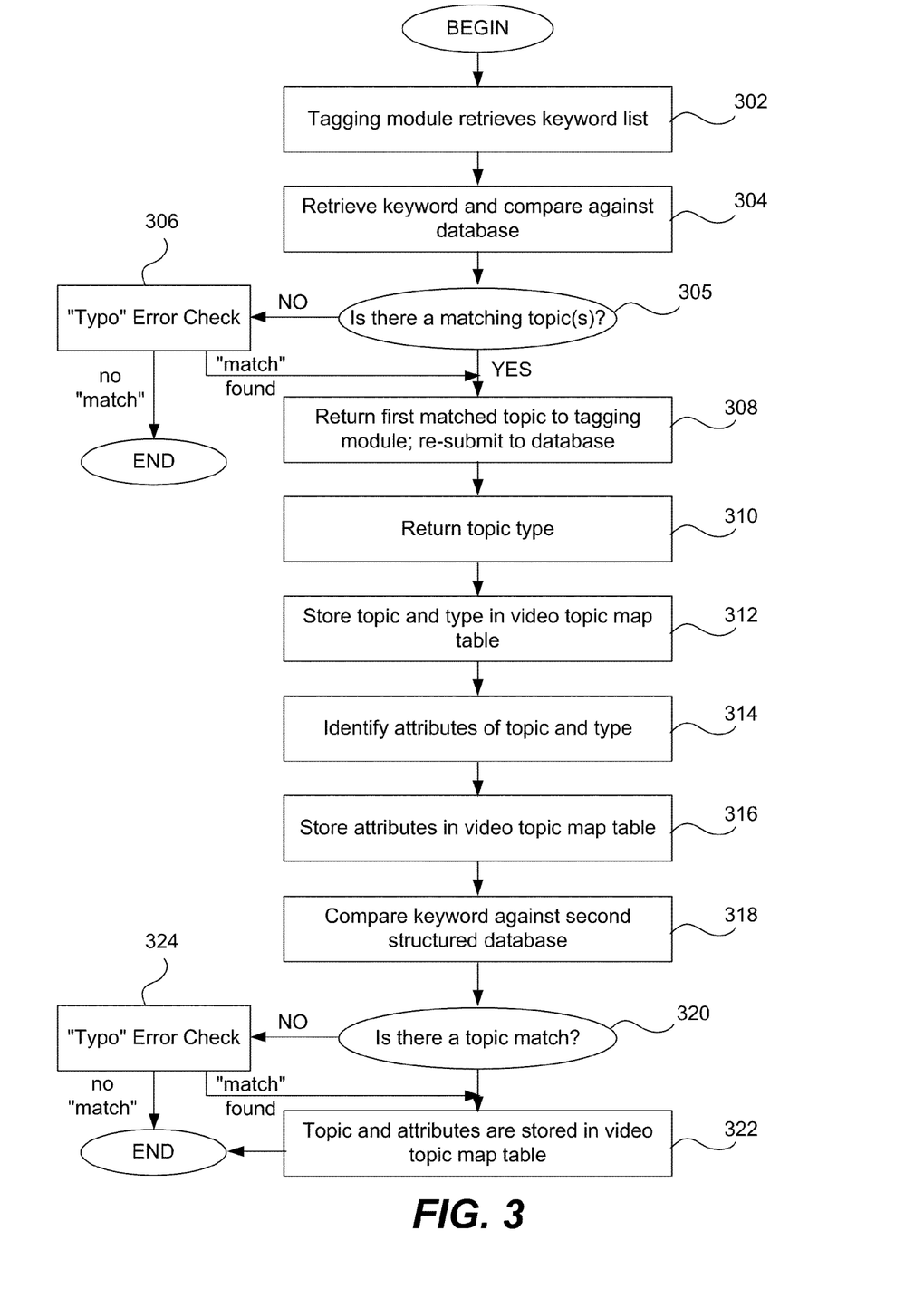
FIG. 3 is a process of creating semantic metadata entries in a video topic map table relating to the video based on the video keyword list in accordance with one embodiment.

FIG. 3 is a process of creating semantic metadata entries in a table (hereinafter referred to as a video topic map table) relating to the video based on the video keyword list (derived in FIG. 2) in accordance with one embodiment. Continuing with a process of creating semantic metadata on the same video, at step 302 the semantic tagging module retrieves the keyword list for the video using a unique video ID from a video keyword table in the device or system memory. At step 304, a keyword from the list is retrieved and compared against what may be referred to as one or more structured knowledge or information sources. In one embodiment, this source is external to the system or device executing the semantic tagging module and is accessed via a network (in most cases, the Internet). In one embodiment, a structured knowledge source may be maintained, operated, and made available by a third party to the public or to subscribers. For example, this structured knowledge source, which may be a structured database of topics or a semantic database, may be FreeBase. FreeBase has all the topics available in Wikipedia and in addition, has tens of thousands of topics entered by general users and FreeBase developers. It is an online, dynamic source that grows every day. Another example of a structured knowledge database that may be searched is Tribune Media Services EPG, discussed below.

The keyword retrieved at step 304 is compared to the source to see if there is a corresponding topic or topics in the database. At step 305 it is determined if there is a corresponding match. If there is no corresponding topic that matches, the keyword is returned and control goes to step 306 where a process that ensures that a typographical error in the keyword did not cause a "no match" condition at step 305. This subprocess is described below. If there is a match between the keyword and one or more topics in the database, the first topic that matches is returned to the tagging module and then resubmitted to the database at step 308. At step 310, a topic type is returned to the module. For example, if the topic returned at step 308 is "Bill Clinton," the type may be "person" or if the topic is "General Motors," the type may be "company," and so on. In other embodiments, if there is a topic or topics that match the keyword, those topics and their types are returned to the tagging module.

Figure 4:
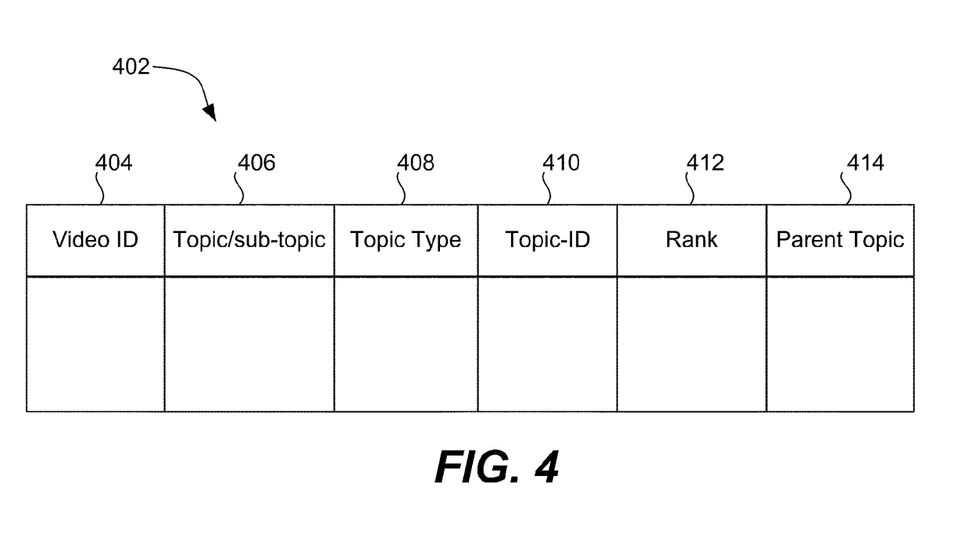
FIG. 4 is a block diagram of a video topic map table in accordance with one embodiment.

At step 312 in one embodiment the topic name and topic type are stored in the video topic map table, along with a ranking (that of the initial keyword), the unique video ID, and when applicable, an identifier of the parent topic, as described below. An example of a video topic map table is shown in FIG. 4. Step 312 is the first instance of the topic and type information (the enhanced semantic metadata) of the video that is stored by the tagging module. This information reflects directly related information about the video (i.e., a topic and topic type that is directly addressed in the video). As shown below, in one embodiment, only such directly related data records which are stored at step 312, have a ranking associated with them. As noted, the topic ranking is the same as the ranking of the keyword selected at step 302.

Going back to step 305, if there is no matching corresponding topic, it is assumed that there may have been a typographical error in the keyword and control goes to step 306. In one embodiment, all topics in the structured topic database that start with the same letter as the keyword (which did not result in a match) and whose length is comparable to the length of the keyword, are identified. For example, the length of the keyword ("len") is determined and the starting letter is identified. The structured database is then searched for all topics starting with the same letter and having a length between len−1 and len+1. Then, the "string distance" between the keyword and each of the structured knowledge database topics identified (that match the above criteria) is computed. Any suitable string distance algorithm, such as the known "edit distance" algorithm, may be used. If the string distance computed is less than or equal to 2, the database topic is considered a match for the keyword. For example, if the non-matched keyword at step 306 is "sasmung" and a database topic "Samsung" exists, the string distance between these two words is two and, consequently, the topic "Samsung" will be considered as a topic match. If such a match is found at step 306, control then goes to step 308 where the topic is resubmitted to the structured database. If there is still no match, then the process is complete. In this case, no entries are made to the video topic map table.

At step 314, the topic and type (e.g., "General Motors" and "company") are matched against the structured knowledge database to see if there are any attributes or properties associated with the topic. If there is one or more attributes associated with the topic, they are retrieved at step 316 and stored in the video topic map table. For example, an attribute or sub-topic for "Bill Clinton" may be "U.S. presidents" which may have a type "profession." This second instance of storing data in the table creates a second record that reflects an indirectly related topic of the video, namely, "U.S. presidents" having a type "profession." Because this sub-topic was not retrieved using a keyword from the keyword list, there is no ranking associated with it or included (e.g., it may be assigned a NULL ranking).

At step 318, each keyword in the keyword list is compared against a second structured knowledge database. In one embodiment, the keywords may be compared against multiple structured knowledge databases or other type of databases that provide optic and attribute data. Another example of a suitable database may be the Tribune Media Services EPG Archives, which provides detailed topics and data on actors, directors, producers, and so on for broadcast TV and cable programs. It may also include such information on motion pictures. At step 320, it is determined whether there is a match between the keyword and the topics in the second database. If there is a match, control goes to step 322. If not, control goes to step 324. At step 322, the topic name is the name of the person that matched the keyword and the type is "person." Another attribute of the topic may be the profession, e.g., director, actor, etc.). This data is retrieved at step 322 and stored in the video topic map table in the same manner as topics and sub-topics from the first structured database.

If there is no match, at step 324 the same checks are made as described above to ensure that a typographical error did not cause a non-match condition. The process is generally the same: all names from the second knowledge database (e.g., names from the list of Person names) that start with the same letter as the keyword and whose length is comparable to the length of the keyword are identified. The comparable length is taken, in one embodiment, as the length of the keyword plus one or minus one, len+1 and len−1. The string distances between the keyword and each of the names identified using the starting letter and comparable length are computed. As noted, any known string distance computing algorithm may be used. If the string distance is less than or equal to a certain threshold (e.g., 2), the person name from the identified person names is considered as a topic match for the keyword at hand.

As noted above, the topics associated with the video are stored in the table with the same rank as that of the corresponding keyword. The subtopics associated with the video are inserted into the table with a rank of "0" to indicate that it is a subtopic or attribute.

FIG. 4 is a block diagram of a video topic map table in accordance with one embodiment. Table 402 may have the following columns or fields: video-identifier 404, topic (or sub-topic) name 406, topic type 408, topic-identifier 410, rank 412, and parenttopicID 414. Topic-identifier 410 is an identifier taken from the structured knowledge database, if such an identifier is available. For example, FreeBase has an identifier for its topics. ParenttopicID 414 for a sub-topic is the topic-id for the topic for which the subtopic is an attribute of. In other embodiments, table 402 may have more or fewer fields than those described here. The entries in video topic map table 402 may be easily processed or searched using commercially available data visualization tools (e.g. Adobe's Flex tool and Flex's SpringGraph component). Table or file 402 stores the semantic metadata for each video. In this embodiment, the video files themselves or the metadata portion of the files may not be altered or updated. The semantic metadata for each video contained in table 402 may be searched by the host system, such as the video server, or by a user.

Figure 5:
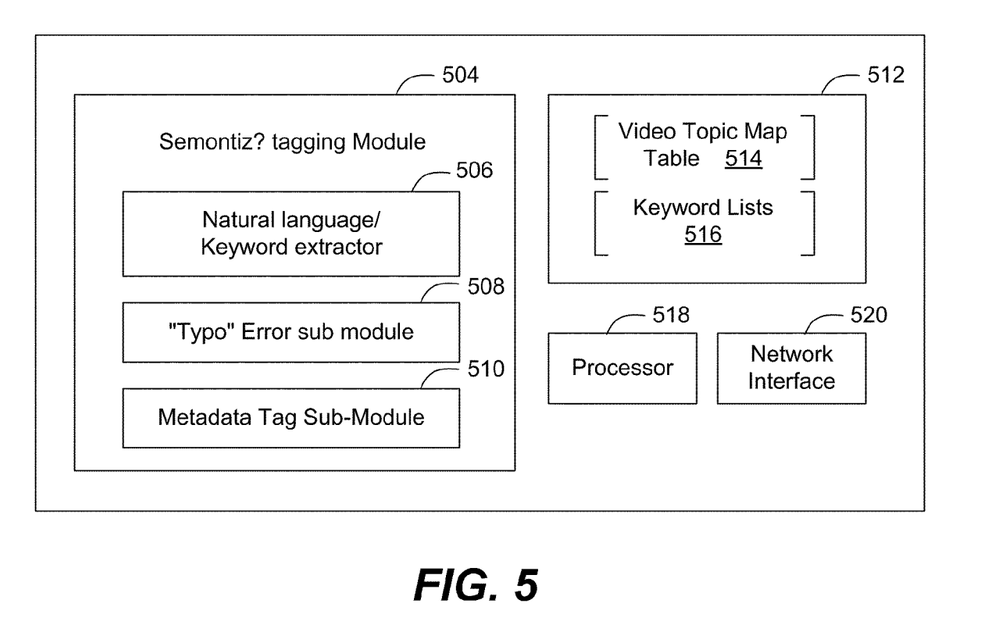
FIG. 5 is a logical block diagram of an external host system showing some of the relevant components and modules in accordance with one embodiment.

FIG. 5 is a logical block diagram of an external host system showing some of the relevant components and modules in accordance with one embodiment. A host system 502, which may be a video server, a PC, a DVR, TV, media server, or any suitable portable device, such as a smart phone or mobile handset computing device. A semantic tagging module 504 performs most or all of the processes described above. In one embodiment, tagging module 504 may have a natural language processor and keyword extractor 506. In another embodiment, the language processor and extractor may be separate components. A typographical error sub-module 508 performs the error processing described in step 306. A metadata tag sub-module 510 operates on existing metadata tags from the video file to derive a keyword list as described in steps 206 to 210.

External host system 502 also has a non-volatile memory 512 that stores a video topic map table 514 or equivalent file for storing the semantic metadata associated with the videos and that is searchable or processed using, for example, a data visualization tool (e.g., Adobe's Flex tool and SpringGraph component) to enable users to navigate videos and find interesting relationships between videos based on topics and subtopics related to the videos. Also stored in memory 512 are keyword lists 516 derived in FIGS. 2A and 2B. In one embodiment, the keyword list may be a combination of keywords derived or extracted using natural language processing from existing narrative-type metadata for the video and keywords derived from tag-type metadata for the video, both of which are derived using different methodologies and components. Also included is at least one processor 518 for executing the code associated with all the modules, sub-modules, and components described above. Also included is a network interface which may allow for wired or wireless communication between host device 502 and external data sources, such as the structured knowledge databases, video archives, and other sources that may be needed for host system 502 to operate.

Figure 6A:
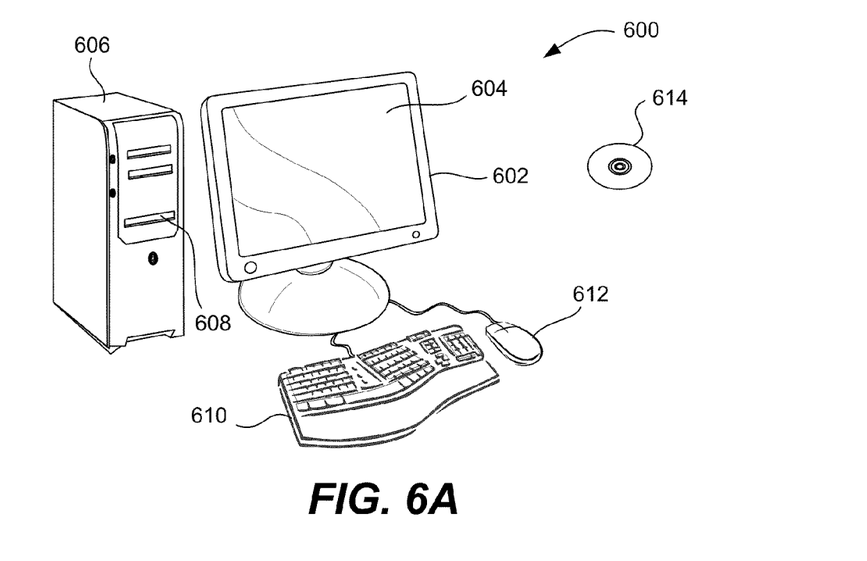
FIGS. 6A and 6B illustrate a computing system suitable for implementing embodiments of the present invention.
Figure 6B:
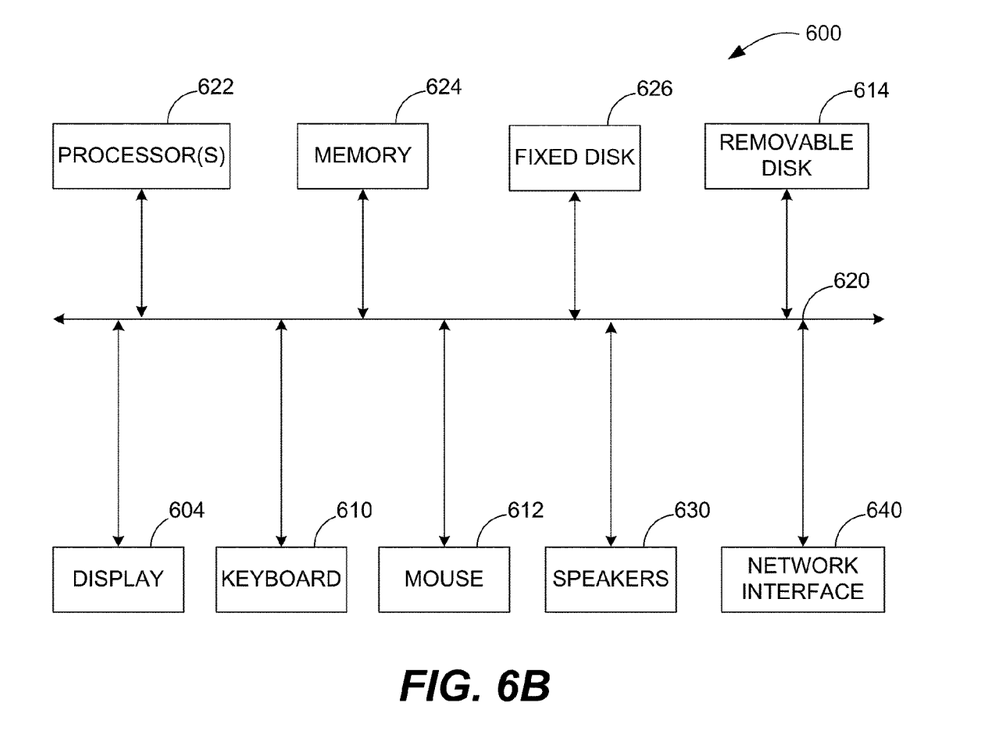

FIGS. 6A and 6B illustrate a computing system 600 suitable for implementing embodiments of the present invention. FIG. 6A shows one possible physical implementation of the computing system (i.e., a personal computer). the internal components of the computing system may have many physical forms including an integrated circuit, a printed circuit board, a digital camera, a small handheld device (such as a mobile telephone, handset or PDA), a personal computer or a server computer, a mobile computing device, an Internet appliance, and the like. In one embodiment, computing system 600 includes a monitor 602, a display 604, a housing 606, a disk drive 608, a keyboard 610 and a mouse 612. Disk 614 is a computer-readable medium used to transfer data to and from computer system 600. Other computer-readable media may include USB memory devices and various types of memory chips, sticks, and cards.

FIG. 6B is an example of a block diagram for computing system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A computing device for storing video files comprising:
   a processor;
   a network interface for communicating with an external structured knowledge data source;
   a semantic metadata module; and
   a memory storing:
   a topic map table having a topic field and a topic type field; and
   a keyword list including a first set of keywords and a second set of keywords,
   wherein the semantic metadata module creates the keyword list and stores semantic metadata relating to a video in the topic map table;
   wherein the first set of keywords is extracted from existing metadata having a natural language format in a narrative form, said extracting of the first set performed using natural language processing,
   wherein the second set of keywords is extracted from the existing metadata, the second set having a tag list format, said extracting of the second set configured to extract keywords from a tag list with delimiters and from a tag list without delimiters, wherein keywords from the tag list without delimiters are in a one-word combination, a two-word combination, or a three-word combination,
   wherein a relevance rank is assigned to a keyword in the first set and to a keyword in the second set, such that relevance rank assigned based on a keyword source, such that a keyword from the first set is given a high relevance rank if it is from a title or a description and is given a low relevance rank if from a comment,
   wherein when a keyword is from the second set, the tag list format having delimiters, the keyword is given a medium relevance rank and when a keyword is from the second set without delimiters, the keyword is given a relevance rank dependent on a number of words comprising the keyword, and
   wherein the relevance rank of a duplicate keyword is increased.

2. A computing device as recited in claim 1 further comprising:
   a natural language processor and keyword extractor for deriving the first plurality of keywords.

3. A computing device as recited in claim 2 further comprising:
   a metadata tagging sub-module for deriving the second plurality of keywords.

4. A computing device as recited in claim 3 wherein the keyword list includes the first plurality of keywords and the second plurality of keywords.

5. A computing device as recited in claim 1 wherein the topic map table includes a rank field for storing relevance data relating to the relevance of a source of a keyword.

6. A method of creating a keyword list for a video, the method comprising:
   examining existing metadata associated with the video;
   extracting a first set of keywords from the existing metadata having a natural language format in a narrative form, said extracting the first set of keywords performed using natural language processing;
   extracting a second set of keywords from the existing metadata having a tag list format, wherein said extracting the second set of keywords is configured to extract keywords from a tag list having a list with delimiters and from a tag list without delimiters, wherein keywords from the tag list without delimiters are in a one-word combination, a two-word combination, or a three-word combination;
   assigning a relevance rank to keywords in the first set of keywords and in the second set of keywords wherein the relevance rank is assigned based on a keyword source, wherein when a keyword from the first set of keywords is from a title or from a description, it is given a high relevance rank and when it is from a comment it is given a low relevance rank,
   wherein when a keyword from the second set of keywords is from the keyword list having delimiters, the keyword is given a medium relevance rank and when it is from the keyword list without delimiters, the keyword is given a relevance rank dependent on a number of words comprising the keyword, and
   wherein the relevance rank of a duplicate keyword is increased, and
   creating the keyword list by combining the first set of keywords and the second set of keywords, wherein the keyword list is derived from the existing metadata associated with the video.

7. A method as recited in claim 6 further comprising:
   removing duplicate keywords from the first set of keywords and the second set of keywords.

8. A method as recited in claim 7 further comprising:
   adjusting the relevance rank of a duplicate keyword, wherein the relevance rank is increased.

9. A method as recited in claim 6 wherein extracting the second set of keywords from existing metadata having a tag list format further comprises:
   determining the type of delimiter between tags;
   if the type of delimiter is not a space, inserting each tag into the second set of keywords; and
   if the type of delimiter is a space, inserting each tag and consecutive tag strings into the second set of keywords.

10. A method as recited in claim 6 further comprising:
    deriving semantic metadata utilizing the multiple keywords, wherein the semantic metadata is arranged based on topic and topic-type, thereby facilitating queries of multiple files.

11. A method as recited in claim 10 wherein deriving semantic metadata utilizing the multiple keywords further comprises:
    comparing a keyword with topics in a first external database; and if there is a match, returning a first matched topic from the first external database.

12. A method as recited in claim 11 further comprising:
storing the first matched topic and a corresponding first topic type in a video topic map table.

13. A method as recited in claim 11 further comprising:
comparing the keyword with topics in a second external database; and
if there is a match, returning a second matched topic from the second external database.

14. A method as recited in claim 13 further comprising:
storing the second matched topic and a corresponding second topic type in the video topic map table.

15. A tangible and non-transitory computer-readable medium storing computer instructions for creating a keyword list for a video, the computer-readable medium comprising:
computer code for examining existing metadata associated with the video;
computer code for extracting a first set of keywords from the existing metadata having a natural language format in a narrative form, said extracting the first set of keywords performed using natural language processing;
computer code for extracting a second set of keywords from the existing metadata having a tag list format, wherein said extracting the second set of keywords is configured to extract keywords from a tag list having a list with delimiters and from a tag list without delimiters, wherein keywords from the tag list without delimiters are in a one-word combination, a two-word combination, or a three-word combination;
computer code for assigning a relevance rank to keywords in the first set of keywords and in the second set of keywords wherein the relevance rank is assigned based on a keyword source, wherein when a keyword from the first set of keywords is from a title or from a description, it is given a high relevance rank and when it is from a comment it is given a low relevance rank,
wherein when a keyword from the second set of keywords is from the keyword list having delimiters, the keyword is given a medium relevance rank and when it is from the keyword list without delimiters, the keyword is given a relevance rank dependent on a number of words comprising the keyword, and
wherein the relevance rank of a duplicate keyword is increased, and
computer code for creating the keyword list by combining the first set of keywords and the second set of keywords, wherein the keyword list is derived from the existing metadata associated with the video.

* * * * *